United States Patent [19]

Heyne

[11] 3,730,210
[45] May 1, 1973

[54] MIXING VALVE ASSEMBLY
[75] Inventor: Marvin E. Heyne, Anoka, Minn.
[73] Assignee: The Cornelius Company, Anoka, Minn.
[22] Filed: Nov. 16, 1971
[21] Appl. No.: 199,164

[52] U.S. Cl. ............137/329.1, 137/607, 137/614, 137/801, 222/567
[51] Int. Cl. .......................................F16k 19/00
[58] Field of Search..................137/329.1, 329.2, 137/329.3, 329.4, 360, 604, 607, 614, 798, 801; 222/567, 570

[56] References Cited

UNITED STATES PATENTS 3,357,599  12/1967  Douglas et al.................137/360 X
3,556,347  1/1971  Segal............................222/567 X
3,659,626  5/1972  Arbon...........................137/329.1

Primary Examiner—Robert G. Nilson
Attorney—Carlton Hill et al.

[57] ABSTRACT

A mixing valve assembly includes a mounting sleeve, a first valve body with a pair of fluid passages leading to a single spout under the control of a single actuator, the first valve body being keyed to the mounting sleeve and held thereon by a threaded locking ring, and a second valve body with a pair of fluid passages each having a self-closing valve normally held open by the first valve body, there being telescopic fluid connections that are slidably detachable that form part of said valve bodies whereby the first valve body may be quickly demounted for service without use of tooling.

7 Claims, 4 Drawing Figures

Patented May 1, 1973 3,730,210

3,730,210

MIXING VALVE ASSEMBLY

BACKGROUND

This invention pertains to a mixing valve assembly, and more specifically to one that can be quickly disconnected from pressurized beverage lines.

PRIOR ART

It has been known heretofore to utilize mixing valves for dispensing beverages, the liquid beverage ingredients being brought in separate lines and mixed within the valve assembly in proper proportions to provide the desired product. Where a multiplicity of valves is connected to a given system, it has been necessary heretofore to depressurize the system for the removal of any valve for service, or in the alternate, to provide an in-line shut-off valve for each of the ingredients. Further, it has been necessary heretofore to utilize one or more hand tools to effect removal of such mixing valve for service from the pressurized lines.

SUMMARY OF THE INVENTION

The present invention is directed to a mixing valve such as for post-mix dispensing wherein the valve body is constructed in two parts joined together by a pair of telescopic fluid connections, each passage in the first valve body having conventional valve means both under the control of a single actuator, and each passage in the second valve body having a self-closing valve.

Accordingly, it is an object of the present invention to provide an improved mixing valve assembly.

A further object of the present invention is to provide a mixing valve assembly wherein the main portion thereof can be demounted from pressurized lines without relieving such pressure.

A still further object of the present invention is to provide a mixing valve assembly which can be demounted from sources of liquid without use of any hand tools.

Many other advantages, features and additional objects of the present invention will become manifest to those versed in the art upon making reference to the detailed description of the accompanying sheet of drawings in which a preferred structural embodiment incorporating the principles of the present invention is shown by way of illustrative example.

ON THE DRAWINGS

AS SHOWN ON THE DRAWINGS

Figure 1:
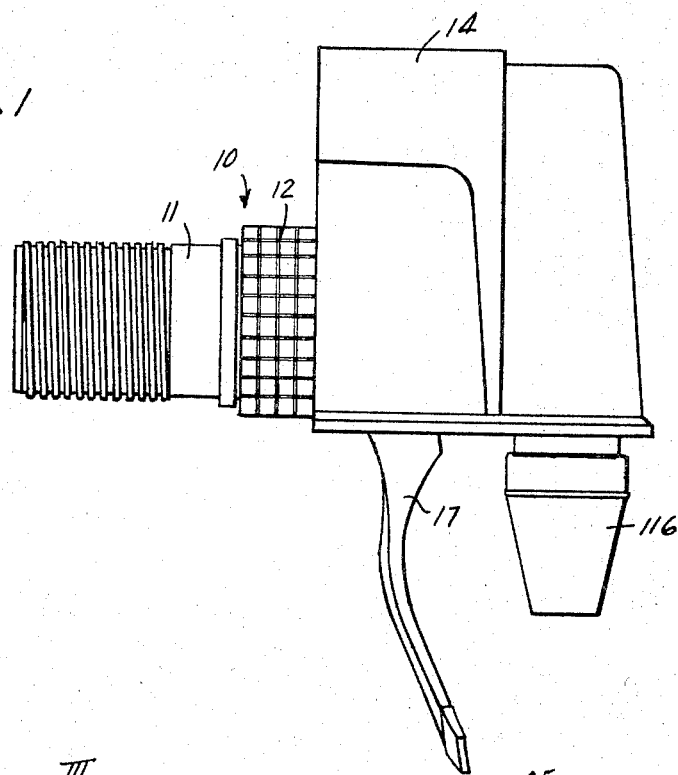
FIG. 1 is a side elevation view of a mixing valve assembly having an internal construction provided in accordance with the principles of the present invention.

The principles of the present invention are particularly useful when embodied in a mixing valve assembly such as shown in FIG. 1, generally indicated by the numeral 10. The mixing valve assembly 10 includes a mounting sleeve 11 which is secured by a locking ring 12 to a first valve body 13 (FIG. 2) which is enclosed by a cover 14 and which has a pair of passages 15, 16 (FIG. 3) leading to a single spout 116, there being a valve in each of the passages 15, 16 under the control of a single actuator 17. In one form of utilization of the invention, the actuator 17 controls an electric switch to provide solenoid operation of the valve means associated with the passages 15, 16 as is known. The mounting sleeve 11 has external threads by which the same may be secured to a support means (not shown) for instance with the use of an appropriate nut and washer, as is known.

Figure 2:
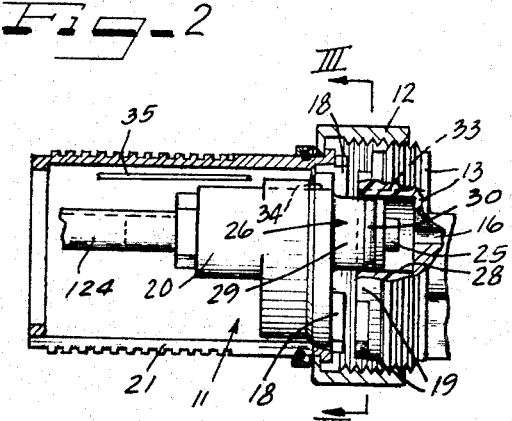
FIG. 2 is a cross-sectional view of the rear portion of the valve shown in FIG. 1 in a partially assembled form.
Figure 3:
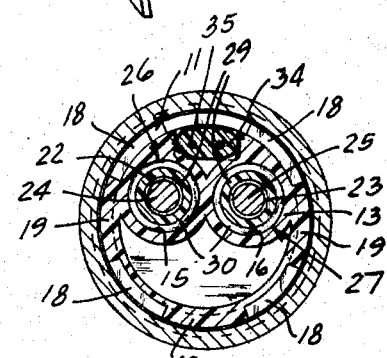
FIG. 3 is a cross-sectional view taken along line III—III of FIG. 2.

As shown in FIG. 3, the forward end of the sleeve 11 is provided with a number of forwardly projecting projections 18 and the first valve body 13 is provided with a corresponding or complemental arrangement of rearwardly projecting projections 19 which interfit in response to axial movement between the first valve body 13 and the mounting sleeve 11. Collectively, the projections 18, 19 are referred to herein as keying means which are used primarily to orient the spout 116 so as to extend in a vertical direction. As shown in FIG. 2, the locking ring 12 is threaded as is the rear part of the first valve body 13, and the keying means or projections 18, 19 cannot interfit with each other unless the locking ring 12 is at least partially engaged with the threads on the first valve body 13.

Figure 4:
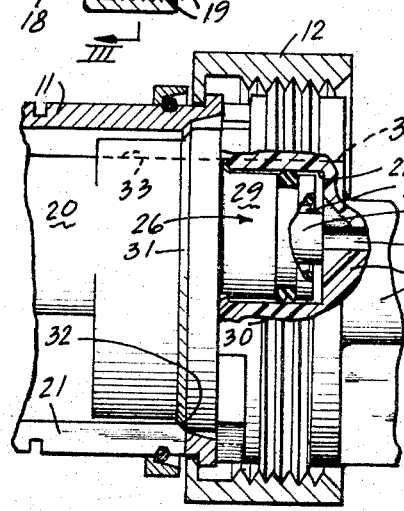
FIG. 4 is an enlarged fragmentary cross-sectional view showing a portion of the structure of FIG. 2 in the fully assembled form.

The mixing valve assembly 10 includes a second valve body 20 disposed in the mounting sleeve 11, the sleeve being slotted at 21 to receive keying carried by the support means (not shown). The second valve body 20 has a pair of fluid passages 22, 23 (FIG. 3) which are respectively arranged to be connected by a hose or conduit 124 to two sources of liquid which are to be mixed to provide the finished product. In each of the fluid passages 22, 23 there is provided a self-closing valve having stems 24, 25 which normally engage the first valve body 13 as shown in FIG. 4 but which, as shown in FIG. 2, cannot engage the first valve body 13 unless there has been a predetermined amount of thread engagement by the locking ring 12.

To connect the fluid passages 22, 23 in the second valve body 20 to the fluid passages 15, 16 in the first valve body 13 there is provided a pair of telescopic fluid connections 26, 27 which are slidably detachable. The fluid connections 26, 27 have parallel axes that are parallel to the axis of the lock ring 12. In this embodiment, each fluid connection 26, 27 comprises a cylindrical recess 28 in the first valve body that forms a part of the fluid passages 15, 16 and a tubular cylindrical projection 29 which is integral with the second valve body 20. The cylindrical projection 29 of each fluid connection 26, 27 is provided with a fluid seal 30 which is axially slidable within the cylindrical recess 28. As shown in FIG. 2, the stem 25 of the self-closing valve cannot engage the first valve body 13 until after fluid tightness has been established by the fluid seal 30 with respect to the cylindrical recess 28.

The second valve body 20 has an external shoulder 31 which engaged a shoulder 32 on the inside of the mounting sleeve 11. The locking ring 12 is retained on the mounting sleeve 11 by means of mutually engaging flanges and a snapring covered by a spacer ring.

The valve bodies 13, 20 are respectively provided with aligned wiring slots 33, 34 so their wiring may be loosely brought along as at 35 in FIG. 2 through the aligned slots 33, 34 to an area under the cover 14. Sufficient slack is maintained in the wiring 35 so that the valve body 13 can be removed, electrical quick disconnect fittings being employed as is conventional.

The locking ring 12 can be manually rotated in either direction from the position shown in FIG. 2, and the threads thereof will serve to cam the valve bodies 13, 20 together or apart as may be desired. Thus no tooling is required for the removal of the valve structure under the cover 14 from the fixture or support means on which the mounting sleeve 11 is carried. Further, the presence of the self-closing valves in the passages 22, 23 of the second valve body 20 enables such installation and removal without depressurization of the fluid lines 124. Moreover, by the aforesaid construction, there will not only be virtually no leakage of liquid as a consequence of connection and disconnection, but also fluid pressure in the recesses 28 will not propel the valve body 13. The fluid pressure is hydrostatic and any loosening of the nut 12 immediately drops such pressure.

Although various minor modifications might be suggested by those versed in the art, it should be understood that I wish to embody within the scope of the patent warranted hereon, all such embodiments as reasonably and properly come within the scope of my contribution to the art.

I claim as my invention:

1. A mixing valve assembly, comprising, in combination:
   a. a mounting sleeve adapted to be secured to support means;
   b. a first valve body having a pair of fluid passages leading to a single spout under the control of a single actuator;
   c. keying means on said mounting sleeve and on said first valve body for positively orienting said spout vertically;
   d. a manually detachable locking ring acting between said first valve body and said mounting sleeve;
   e. a second valve body disposed in said mounting sleeve and having a pair of fluid passages adapted to be connected to two sources of liquid; and
   f. a pair of slidably detachable telescopic fluid connections having parallel axes and forming part of said valve bodies and connecting said passages of said second valve body to said passages of said first valve body.

2. A mixing valve assembly according to claim 1, in which said fluid connections each comprise a cylindrical recess in said first valve body and a cylindrical projection on said second valve body and a fluid seal therebetween.

3. A mixing valve according to claim 1, said valve bodies having means defining a slot extending in parallel to said telescopic fluid connections for loosely bringing wiring through said sleeve to an area within a cover that encloses a portion of said first valve body.

4. A mixing valve according to claim 1, wherein each of said telescopic fluid connections includes an axially slidable fluid seal.

5. A mixing valve according to claim 4 including a pair of self-closing valves in said fluid passages of said second valve body, and each having a stem normally engaging said first valve body.

6. A mixing valve according to claim 5 in which said locking ring and said first valve body have mating threads, said stems being engageable with said first valve body only when said threads are at least partially engaged and said fluid seals are in sealing relation, whereby upon further thread engagement the stems of said self-closing valves are engaged.

7. A mixing valve according to claim 4 in which said locking ring and said first valve body have mating threads, said keying means on said first valve body and on said mounting sleeve being engageable with each other only when said threads are at least partially engaged.

* * * * *